United States Patent
Li et al.

(10) Patent No.: US 8,214,667 B2
(45) Date of Patent: Jul. 3, 2012

(54) CENTRAL PROCESSING UNIT START-UP CIRCUIT OF PORTABLE ELECTRONIC DEVICES

(75) Inventors: Wan-Ning Li, Shenzhen (CN); Ying-Zheng Li, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 356 days.

(21) Appl. No.: 12/605,693

(22) Filed: Oct. 26, 2009

(65) Prior Publication Data

US 2010/0293395 A1 Nov. 18, 2010

(30) Foreign Application Priority Data

May 18, 2009 (CN) .......................... 2009 1 0302418

(51) Int. Cl.
*G06F 1/26* (2006.01)

(52) U.S. Cl. ......... 713/300; 713/310; 713/323; 713/330
(58) Field of Classification Search .................. 713/300, 713/310, 323, 330
See application file for complete search history.

(56) References Cited

U.S. PATENT DOCUMENTS

2004/0113600 A1* 6/2004 Hoshino et al. ............... 323/284
2007/0038334 A1* 2/2007 Chou et al. .................... 700/292

* cited by examiner

*Primary Examiner* — Nitin Patel
(74) *Attorney, Agent, or Firm* — Altis Law Group, Inc.

(57) ABSTRACT

A central processing unit (CPU) start-up circuit for controlling a CPU of a portable electronic device includes a power management unit (PMU) connected to the CPU, an awaking circuit connected to the CPU, and a main power supply connected to the CPU, the PMU and the awaking circuit. The main power supply provides working electric power to the CPU, the PMU detects the status of the main power supply and generates a status signal (SS) according to the detecting result, the awaking circuit detects the status of the main power supply and generates a waking signal (WS) according to the detecting result, and the SS and the WS are both transmitted to the CPU to cooperatively control the CPU to be switched on and switched off.

18 Claims, 4 Drawing Sheets

CENTRAL PROCESSING UNIT START-UP CIRCUIT OF PORTABLE ELECTRONIC DEVICES

BACKGROUND

1. Technical Field

The present disclosure relates to start-up circuits of portable electronic devices, and particularly to a start-up circuit used to start-up central processing units (CPU) of portable electronic devices.

2. Description of Related Art

Portable electronic devices, such as mobile phones, personal digital assistants (PDA) and laptop computers, are widely used. A portable electronic device usually has a CPU installed therein. When the portable electronic device is used, the CPU needs to be activated first for controlling components of the portable electronic device.

FIG. 4 shows a circuit diagram of a conventional CPU start-up circuit 90 of a portable electronic device (not shown). The CPU start-up circuit 90 can activate and turn off a CPU 80 of the portable electronic device, and can also control the CPU 80 to reset. The CPU start-up circuit 90 includes a power management unit (PMU) 91, a main power supply 92, a subsidiary power supply 93 and an awaking switch 94, wherein both the main power supply 92 and the subsidiary power supply 93 can be conventional power supplies of the portable electronic devices. The PMU 91 includes at least two ports 911, 912. The ports 911, 912 are both electrically connected to the CPU 80. The main power supply 92 and the subsidiary power supply 93 are both electrically connected to the CPU 80 and PMU 91. The main power supply 92 can provide working electric power to the CPU 80, and the subsidiary power supply 93 can provide working electric power to the clock of the CPU 80. The awaking switch 94 is electrically connected to the CPU 80. The PMU 91 can generate a reset signal (RS) and a status signal (SS) respectively transmitted to the CPU 80 through the ports 911, 912 to control the CPU 80. Generally, the electric potentials of both the RS and the SS have high levels (e.g., higher than about 2.0V) and low levels (e.g., lower than about 0.8V). The CPU 80 receiving an SS at the high level can be started-up to work. If the working CPU 80 receives an SS at the low level, the CPU 80 is automatically turned off. The working CPU 80 remains to work when receiving an RS at the high level, and resets when receiving an RS at the low level. The turned off CPU 80 receiving an SS at the high level can be switched on by a waking signal (WS) sent from the awaking switch 94.

In use, the main power supply 92 supplies working electric power to the portable electronic device, and both the main power supply 92 and the subsidiary power supply 93 can supply working electric power to the PMU 91. The PMU 91 detects the working status of the main power supply 92 and generates corresponding RS and SS. The subsidiary power supply 93 can provide pull-up voltages to the ports 911, 912, thereby regulating the electric potentials of the RS and the SS into predetermined ranges. When the main power supply 92 works normally, the PMU 91 generates an RS and an SS both at high levels and transmits the RS and the SS to the CPU 80. Thus, the CPU 80 can be switched on by operating the awaking switch 94, and the main power supply 92 can provide working electric power to the CPU 80. When the main power supply 92 is removed or has not sufficient working electric power, the PMU 91 generates an RS and an SS both at low levels and transmits the RS and the SS to the CPU 80, such that the CPU 80 resets and is then switched off. However, the PMU 91 may generate a high-impedance status on the port transmitting the SS (i.e., the port 912) when the main power supply 92 is removed. The high-impedance status may cooperate with the pull-up voltage provided by the subsidiary power supply 93 to form a high electric potential on the port 912. Thus, the CPU 80 may mistakenly identify that the port 912 outputs an SS at the high level. If the switch 94 is mistakenly operated/selected, a WS may be generated and transmitted to the CPU 80. Thus, the CPU 80 will be mistakenly activated, and the portable electronic device may be damaged.

Therefore, there is room for improvement within the art.

BRIEF DESCRIPTION OF THE DRAWINGS

Many aspects of the present CPU start-up circuit can be better understood with reference to the following drawings. The components in the various drawings are not necessarily drawn to scale, the emphasis instead being placed upon clearly illustrating the principles of the present CPU start-up circuit. Moreover, in the drawings, like reference numerals designate corresponding parts throughout the figures.

DETAILED DESCRIPTION

Figure 1:
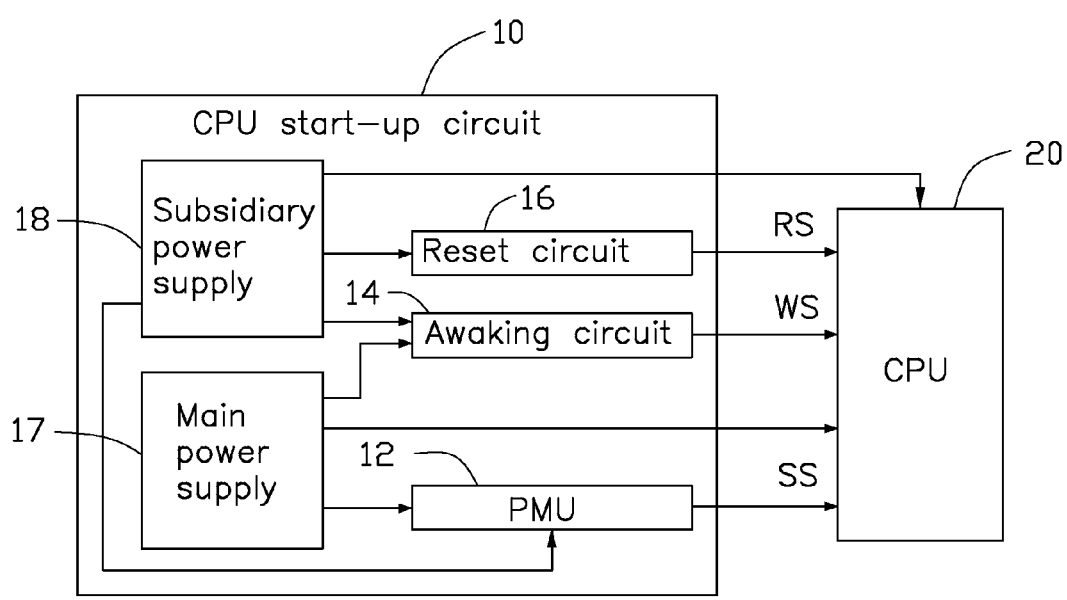
FIG. 1 is a block diagram of a CPU start-up circuit, according to an exemplary embodiment.

FIG. 1 shows a CPU start-up circuit 10 according to an exemplary embodiment. The CPU start-up circuit 10 is installed in a portable electronic device (not shown) to control a conventional CPU 20 of the portable electronic device. The CPU start-up circuit 10 includes a PMU 12, an awaking circuit 14, a reset circuit 16, a main power supply 17, and a subsidiary power supply 18. The main power supply 17 is electrically connected to the CPU 20, the PMU 12 and the awaking circuit 14. The subsidiary power supply 18 is electrically connected to the CPU 20, the PMU 12, the awaking circuit 14 and the reset circuit 16. The main power supply 17 can provide working electric power to the CPU 20, and the subsidiary power supply 18 can provide working electric power to the clock of the CPU 20.

The PMU 12, the awaking circuit 14 and the reset circuit 16 are all electrically connected to the CPU 20. The PMU 12 can generate a status signal (SS), the awaking circuit 14 can generate a waking signal (WS), and the reset circuit 16 can generate a reset signal (RS). The SS, the WS and the RS can be respectively transmitted to the CPU 20 through corresponding conventional ports (not shown) to control the CPU 20. Particularly, the electric potentials of all of the RS, the WS and the SS have high levels (e.g., higher than about 2.0V) and low levels (e.g., lower than about 0.8V). When the CPU 20 receives an SS at the high level and a WS at the high level, the CPU 20 can be automatically switched on. If the working CPU 20 receives an SS at the low level, the CPU 20 is automatically turned off. The working CPU 20 remains to work normally when receiving an RS at the high level, and resets when receiving an RS at the low level.

Figure 2:
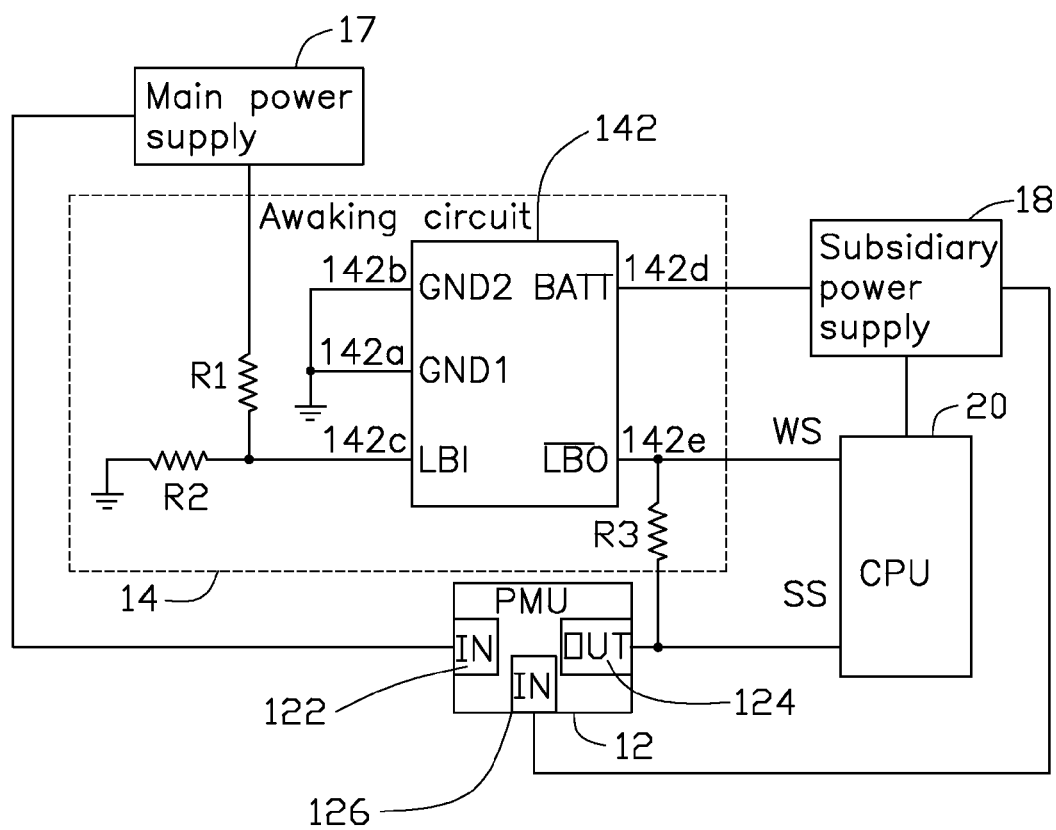
FIG. 2 is a circuit diagram of the awaking circuit in the CPU start-up circuit shown in FIG. 1.

Also referring to FIG. 2, the PMU 12 can be a MAX8660 chip. The PMU 12 can detect the working status of the main power supply 17 and generate the SS according to the detect results. The PMU 12 includes a first input connector 122, an output connector 124, and a second input connector 126. The input connector 122 is connected to the main power supply 17 to detect the working status of the main power supply 17, and the output connector 124 is connected to the CPU 20 to transmit the SS to the CPU 20. Generally, the main power supply 17 is a conventional battery of the portable electronic device, and can output an electric potential in a range of about 2.6V-6.0V. When the output electric potential of the main power supply 17 is higher than 3.5V, the main power supply 17 can work normally, and the PMU 12 generates an SS at the high level. When the output electric potential of the main power supply 17 is lower than 3.2V, the main power supply 17 cannot work normally, and the PMU 12 generates an SS at the low level. The second input connector 126 is connected to the subsidiary power supply 18, such that the subsidiary power supply 18 can provide working electric power to the PMU 12.

The awaking circuit 14 includes an awaking chip 142 and three resistors R1, R2, R3. The awaking chip 142 can be a MAX6775 chip. The awaking chip 142 can detect the working statuses of the main power supply 17, and generate the WS according to the detect results. The awaking chip 142 includes a first grounding connector 142a, a second grounding connector 142b, a first input connector 142c, a second input connector 142d, and an output connector 142e. The first grounding connector 142a and the second grounding connector 142b are both grounded. The resistor R1 has one end connected to the main power supply 17 and another end connected to the resistor R2, and the resistor R2 has one end connected to the resistor R1 and another end grounded. The first input connector 142c is connected between the resistors R1, R2. The second input connector 142d is connected to the subsidiary power supply 18, such that the subsidiary power supply 18 can provide working electric power to the awaking chip 142. The output connector 142e is connected to the CPU 20, and the resistor R3 is connected between the output connector 142e and the output connector 124. Thus, the awaking chip 142 detects the working statuses of the main power supply 17 via the first input connector 142c, and transmits the WS to the CPU 20 via the output connector 142e. Generally, when the output electric potential of the main power supply 17 is higher than 3.5V, the awaking chip 142 generates a WS at the high level. When the output electric potential of the main power supply 17 is lower than 3.2V, the awaking chip 142 generates a WS at the low level. The resistors R1, R2 can be used to regulate the electric potential input to the first input connector 142c. The resistor R3 can be used to increase the electric potential of the SS.

Figure 3:
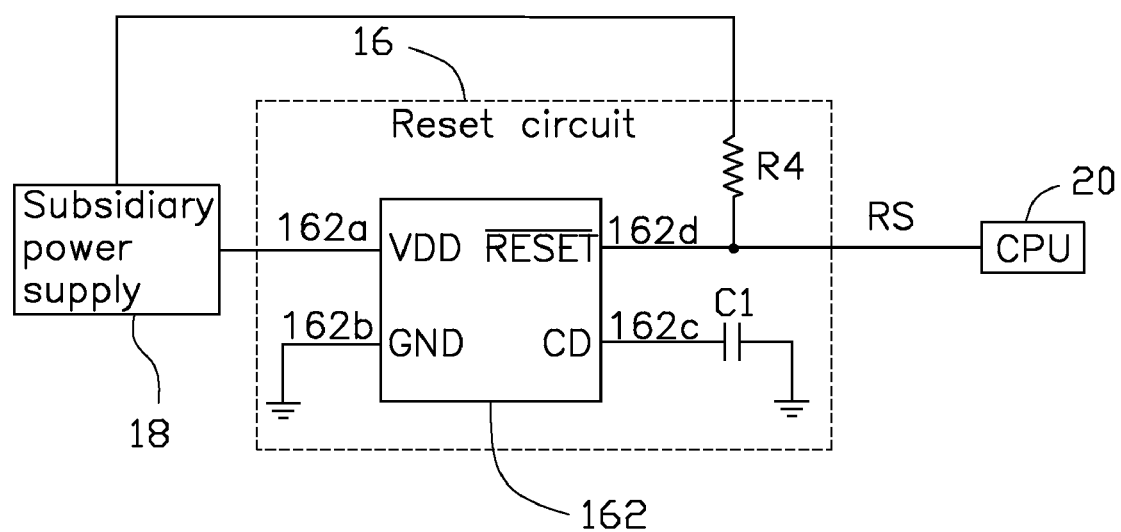
FIG. 3 is a circuit diagram of the reset circuit in the CPU start-up circuit shown in FIG. 1.
Figure 4:
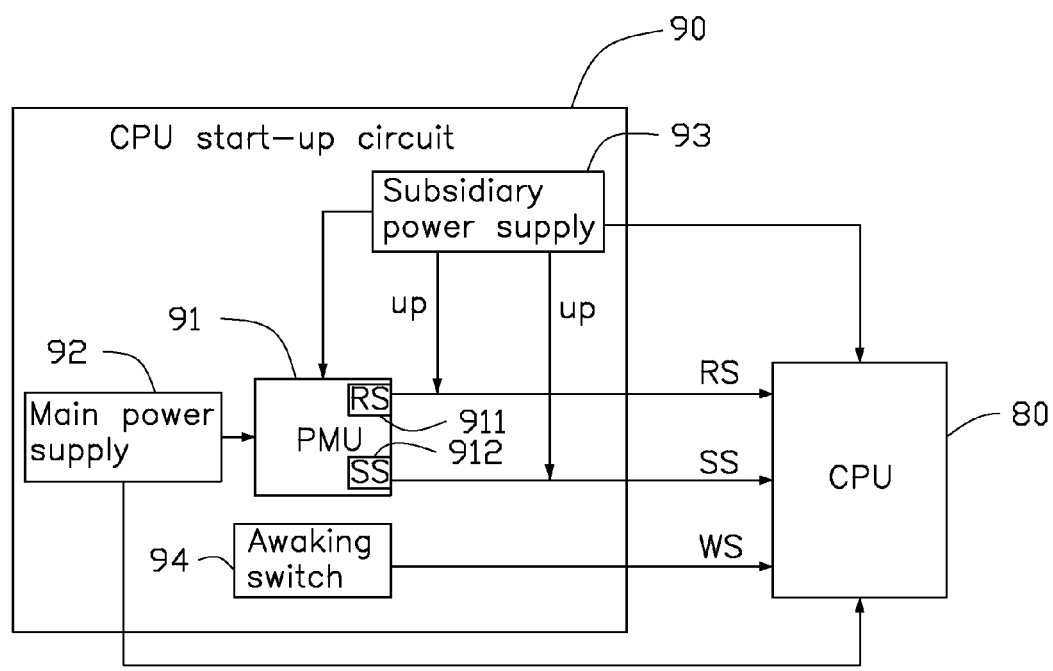
FIG. 4 is a block diagram of a conventional CPU-start circuit.

Also referring to FIG. 3, the reset circuit 16 includes a reset chip 162, a resistor R4 and a capacitor C1. The reset chip 162 can be an R3112 chip. The reset chip 162 can detect the working status of the subsidiary power supply 18 and generate the SS according to the detect results. The reset chip 162 includes an input connector 162a, a grounding connector 162b, a capacitor connector 162c, and an output connector 162d. The input connector 162a is connected to the subsidiary power supply 18 to get working electric power and synchronously detect the working status of the subsidiary power supply 18. The grounding connector 162b is grounded. The capacitor C1 has one pole connected to the capacitor connector 162c and another pole grounded. A reset period of the CPU 20 can be regulated by changing the capacitance of the capacitor C1. The output connector 162d is connected to the CPU 20 to transmit the RS to the CPU 20. The resistor R4 has one end connected to the output connector 162d and another end connected to the subsidiary power supply 18, such that the resistor R4 can be used to increase the electric potential of the RS. The subsidiary power supply 18 can be a conventional battery or a clock oscillator of the portable electronic device, and can output an electric potential in a range of about 2.4V-3.6V. When the output electric potential of the subsidiary power supply 18 is higher than 2.1V, the subsidiary power supply 18 works normally, and the reset chip 162 generates an RS at the high level. When the output electric potential of the subsidiary power supply 17 is lower than 2.1V, the subsidiary power supply 18 cannot work normally, and the reset chip 162 generates an RS at the low level.

In use, when both the main power supply 17 and the subsidiary power supply 18 work normally, they output an electric potential higher than 3.5V and an electric potential higher than 2.1V, respectively. When detecting their corresponding electric potentials, the PMU 12, the awaking chip 142 and the reset chip 162 respectively generate an SS, a WS and an RS, which are all at high levels. The SS, the WS and the RS are transmitted to the CPU 20, and the CPU 20 is automatically switched on and works normally.

When the main power supply 17 is removed or cannot work (e.g., the electric power of the main power supply is exhausted), the output electric potential of the main power supply 17 is lower than 3.2V. Thus, the PMU 12 and the awaking chip 142 respectively generate an SS and a WS that are both at low levels, and the CPU 20 is automatically switched off. Since the electric potential of the output connector 142e (i.e., the WS) is at the low level, despite the PMU 12 may generate a high-impedance status on the output connector 124, the electric potential of the output connector 124 cannot be pulled-up. Therefore, the CPU 20 will not mistakenly identify that the output connector 124 outputs an SS at the high level The reset circuit 16 is electrically connected to the subsidiary power supply 18, and is not connected to the main power supply 17. Thus, the removal or malfunction of the main power supply 17 cannot change the electric potential of the RS. The RS remains at the high level unless the electric potential of the subsidiary power supply 18 is lower than 2.1V (e.g., i.e., the subsidiary power supply 18 is switched off or cannot work). When the electric potential of the subsidiary power supply 18 is lower than 2.1V, the reset chip 162 detects the status of the subsidiary power supply 18 via the input connector 162a, and generates an RS at the low level. The CPU 20 receiving the RS from the output connector 162d and resets.

In the present disclosure, when the main power supply 17 is removed or cannot work normally, the electric potential of the connector transmitting the SS (i.e., the output connector 124) is prevented from being pulled-up, and the awaking circuit 14 cannot generate a WS for activating the CPU 20 since the WS is automatically generated according to the status of the main power supply 17. Thus, the CPU 20 can be protected from being mistakenly activated, and can be automatically switched on when the main power supply 17 works normally. Additionally, the reset circuit 16 independent from the main power supply 17 can work more precisely.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A central processing unit (CPU) start-up circuit for controlling a CPU of a portable electronic device, comprising:
a power management unit (PMU) connected to the CPU;
an awaking circuit connected to the CPU;

a main power supply connected to the CPU, the PMU and the awaking circuit; and a subsidiary power supply connected to the PMU and the awaking circuit; wherein the main power supply provides a first working electric power to the CPU, and the subsidiary power supply provides a second working electric power to the PMU and the awaking circuit; the PMU detects a status of the main power supply and generates a status signal (SS) according to the status of the main power supply detected by the PMU, the awaking circuit detects the status of the main power supply and generates a waking signal (WS) according to the status of the main power supply detected by the awaking circuit, and the SS and the WS are both transmitted to the CPU to cooperatively control the CPU to be switched on and switched off, wherein each of the SS and the WS has a predetermined high voltage level and a predetermined low voltage level, the CPU is switched on when the SS and the WS are at their high voltage levels respectively, and is switched off when the SS is at the low voltage level of the SS.

2. The CPU start-up circuit as claimed in claim 1, wherein the PMU generates an SS at the high voltage level of the SS when detecting that the main power supply works normally and generates an SS at the low voltage level of the SS when detecting that the main power supply cannot work normally.

3. The CPU start-up circuit as claimed in claim 2, wherein the awaking circuit generates a WS at the high voltage level of the WS when detecting that the main power supply works normally and generates a WS at the low voltage level of the SS when the main power supply cannot work normally.

4. The CPU start-up circuit as claimed in claim 1, wherein the PMU includes a first input connector connected to the main power supply to detect the status of the main power supply, a second input connector for getting working electric power, and an output connector connected to the CPU to transmit the SS to the CPU.

5. The CPU start-up circuit as claimed in claim 4, wherein the awaking circuit includes an awaking chip, the awaking chip including a first input connector connected to the main power supply to detect the status of the main power supply, a second input connector for getting working electric power, and an output connector connected to the CPU to transmit the WS to the CPU.

6. The CPU start-up circuit as claimed in claim 5, wherein the output connector of the PMU is connected to the output connector of the awaking chip via a resistor.

7. The CPU start-up circuit as claimed in claim 6, wherein when the electric potential of the WS is at the low voltage level of the WS, the WS is provided to the output connector of the PMU to prevent the SS from being mistakenly pulled-up.

8. The CPU start-up circuit as claimed in claim 4, wherein the subsidiary power supply is connected to the second input connector of the PMU and the second input connector of the awaking chip to provide working electric power to the PMU and the awaking chip.

9. The CPU start-up circuit as claimed in claim 8, further comprising a reset circuit connected to the subsidiary power supply and the CPU, the reset chip detecting a status of the subsidiary power supply and generates a reset signal (RS) according to the status of the subsidiary power supply detected by the reset chip transmitted to the CPU to reset the CPU.

10. The CPU start-up circuit as claimed in claim 9, wherein the reset circuit includes a reset chip, the reset chip includes an input connector connected to the subsidiary power supply to get working electric power and synchronously detect the working status of the subsidiary power supply, and an output connector connected to the CPU to transmit the RS to the CPU.

11. The CPU start-up circuit as claimed in claim 10, wherein the reset circuit further includes a capacitor, and the reset chip further includes a capacitor connector; the capacitor having one pole connected to the capacitor connector and another pole grounded.

12. The CPU start-up circuit as claimed in claim 11, wherein the reset circuit further includes a resistor connected between the output connector of the reset chip and the subsidiary power supply.

13. The CPU start-up circuit as claimed in claim 10, wherein the electric potential of the RS has a high level and a low level, the reset chip generates an RS at the high level when detecting that the subsidiary power supply works normally and generates an RS at the low level when detecting that the subsidiary power supply cannot work normally.

14. The CPU start-up as claimed in claim 13, wherein an RS at the low level transmitted to the CPU causes the CPU to be reset.

15. A CPU start-up circuit for controlling a CPU of a portable electronic device, comprising:
a PMU connected to the CPU;
an awaking circuit connected to the CPU;
a main power supply connected to the CPU, the PMU and the awaking circuit; and
a subsidiary power supply connected to the PMU and the awaking circuit; wherein the main power supply provides a first working electric power to the CPU and the subsidiary power supply provides a second working electric power to the PMU and the awaking circuit, the PMU detects a status of the main power supply and generates an SS according to the status of the main power supply detected by the PMU, the awaking circuit detects the status of the main power supply and generates a WS according to the status of the main power supply detected by the awaking circuit, and the SS and the WS are both transmitted to the CPU to cooperatively control the CPU to be switched on and switched off.

16. The CPU start-up circuit as claimed in claim 15, wherein the subsidiary power supply is connected to the CPU to provide working electric power to a clock of the CPU.

17. The CPU start-up circuit as claimed in claim 15, further comprising a reset circuit connected to the subsidiary power supply and the CPU, the reset chip detecting a status of the subsidiary power supply and generates an RS according to the status of the subsidiary power supply detected by the reset chip transmitted to the CPU to reset the CPU.

18. The CPU start-up circuit as claimed in claim 15, wherein the awaking circuit is connected to the PMU, and the WS is provided to an output connector of the PMU which outputs the SS to prevent the SS from being mistakenly pulled-up.

* * * * *